United States Patent
Demiryont

(10) Patent No.: US 7,704,555 B2
(45) Date of Patent: Apr. 27, 2010

(54) ELECTROCHROMIC DEVICE WITH SELF-FORMING ION TRANSFER LAYER AND LITHIUM FLUORO-NITRIDE ELECTROLYTE

(75) Inventor: Hulya Demiryont, Indian Rocks Beach, FL (US)

(73) Assignee: Eclipse Energy Systems, Saint Petersburg, FL (US)

( * ) Notice: Subject to any disclaimer, the term of this patent is extended or adjusted under 35 U.S.C. 154(b) by 326 days.

(21) Appl. No.: 11/759,059

(22) Filed: Jun. 6, 2007

(65) Prior Publication Data

US 2007/0292606 A1 Dec. 20, 2007

Related U.S. Application Data

(62) Division of application No. 11/425,379, filed on Jun. 20, 2006, now Pat. No. 7,265,891.

(51) Int. Cl.
*C23C 16/00* (2006.01)
(52) U.S. Cl. .................................... 427/248.1
(58) Field of Classification Search ......... 427/160–169, 427/247.1–255.7
See application file for complete search history.

(56) References Cited

U.S. PATENT DOCUMENTS

| 5,757,537 | A | | 5/1998 | Ellis, Jr. et al. | |
|---|---|---|---|---|---|
| 5,824,434 | A | * | 10/1998 | Kawakami et al. | 429/209 |
| 6,094,292 | A | | 7/2000 | Goldner et al. | |
| 6,417,034 | B2 | * | 7/2002 | Kitazume et al. | 438/160 |
| 6,503,810 | B2 | | 1/2003 | Lee | |
| 6,822,778 | B2 | | 11/2004 | Westfall | |
| 2006/0060827 | A1 | | 3/2006 | Ravet et al. | |
| 2006/0209383 | A1 | | 9/2006 | Burdis et al. | |

FOREIGN PATENT DOCUMENTS

WO 96/37809 A1 11/1996

\* cited by examiner

*Primary Examiner*—Michael Cleveland
*Assistant Examiner*—Michael G Miller
(74) *Attorney, Agent, or Firm*—David Kiewit

(57) ABSTRACT

A method of preparing an electrochromic device involves forming multiple layers of selected materials on a substrate in a vacuum processing chamber. A first of these layers is an electrode layer deposited directly on the substrate and used for making contact to a subsequently deposited precursor film, preferably tungsten oxide, from which an electrochromic layer is formed by lithium loading in the presence of ionized nitrogen. This not only forms the electrochromic layer by diffusion of the lithium into the tungsten oxide, but also forms a thin lithium nitride ion transfer layer on the then exposed surface. Subsequently, a lithium fluoro-nitride electrolyte layer is formed on the ion transfer layer by evaporation from a lithium fluoride source in the presence of ionized nitrogen. An ion storage layer, which may be a vanadium oxide and a transparent second electrode layer are subsequently vacuum deposited.

17 Claims, 4 Drawing Sheets

ELECTROCHROMIC DEVICE WITH SELF-FORMING ION TRANSFER LAYER AND LITHIUM FLUORO-NITRIDE ELECTROLYTE

CROSS REFERENCE TO OTHER APPLICATIONS

This application is a divisional of applicant's U.S. Ser. No. 11/425,379, filed Jun. 20, 2006.

BACKGROUND OF THE INVENTION

1. Field of the Invention

The invention relates to particular multi-layer structure and fabrication techniques for forming electrical devices, and in particular, for forming electrochromic devices of the sort used to modulate visible illumination.

2. Background Information

Generally speaking, an electrochromic device ('ECD') comprises two active layers separated by an electrolyte (sometimes referred to as an 'EL' or 'EL layer') through which a selected mobile ion can be controllably moved from one of the active layers to the other. Both of the active layers can contain varying concentrations of the mobile ion. In at least one of the active layers, commonly referred to as the 'electrochromic layer' ('EC layer'), changes in the ion concentration are accompanied by changes in the color and transparency of the layer. In the other active layer, commonly referred to as the 'ion storage layer' (IS layer), changing the ion concentration may or may not be accompanied by notable changes in transparency or coloration. If the IS does not show a visible change, it is referred to as a "passive ion storage layer". If the applied voltage causes an optical change in the IS layer similar to the one occurring in the EC layer, it is called a 'complementary ion storage layer".

Operation of an electrochromic device generally involves applying a DC voltage between the electrochromic and ion storage layers so as to cause the mobile ions to move from one layer to the other and to thereby selectively alter the coloration and transparency of the EC layer. This is commonly described in terms of the EC layer, or of the entire ECD, as being switched between 'bleached' and 'colored' states. Longstanding concerns of ECD development include finding film systems in which the transition between the two states is relatively speedy, can be accomplished with relatively low voltages, and provides a large change in transparency between the bleached and colored states. Another performance concern is maximizing the 'self bleaching time' of coloration decay after removal of the DC voltage.

In addition to the EC, EL, and IS layers, there are two electrode layers in an ECD, one abutting the EC layer and the other abutting the IS layer. The electronic conductivity of these layers is often an important consideration and can impose limitations on the switching speed and the uniformity of coloration.

Additional layers may be required in various ECD embodiments in order to protect the ECD during fabrication and service, or to prevent internal degradation. The most common additional external layer is an overcoat serving as an ambient moisture barrier. The overcoat layer is usually a transparent polymer that may be applied subsequent to vacuum processing by dipping, spraying, spinning, screening, or any other suitable approach.

In some ECDs additional layers (e.g., of silicon monoxide and silicon dioxide) are deposited between a flexible substrate and the EC electrode in order to provide improved adhesion and to prevent the otherwise brittle ECD from flaking off the substrate. It may be noted that avoiding the use of thick flexibility enhancing and adhesion promoting layers could reduce vacuum processing times.

Also, internal ion transfer layers are used in ECDs to enhance ion transport efficiency and to prevent degradation (e.g., oxidation) of earlier-deposited layers during either the deposition of subsequently formed layers or during processing steps at ambient pressure, as may be undertaken to provide metal bus bar contacts to the IS layer.

BRIEF SUMMARY OF THE INVENTION

One aspect of the invention is that it provides an electrochromic device prepared by forming multiple layers of selected materials on a substrate in a vacuum processing chamber. A first of these layers is an electrode layer deposited directly on the substrate and used for making contact to a subsequently deposited precursor film from which an electrochromic is formed. This precursor film may comprise a metal oxide and is preferably tungsten oxide. In a subsequent step a mobile ion, which is preferably lithium, is deposited in the presence of ionized nitrogen. This forms the electrochromic layer, due to diffusion of the lithium into the tungsten oxide. At the same time, it forms a thin lithium nitride ion transfer layer on the then exposed surface. Subsequently, an electrolyte layer comprising lithium, fluorine and nitrogen is formed directly on the ion transfer layer and an ion storage layer is deposited directly on the electrolyte layer. A transparent second electrode layer is then deposited directly on the ion storage layer.

Another aspect of the invention is that it provides a method of making an electrochromic device by sequentially forming a plurality of layers of selected materials in a vacuum processing chamber. An initial step may comprise depositing a first electrode layer on a substrate and then venting the vacuum processing chamber so that bus bar masking can be applied to the first electrode layer. Subsequently, the processing chamber is re-evacuated and a precursor film used for forming an electrochromic film is deposited on the first electrode layer. This precursor layer may comprise tungsten oxide evaporated from a tungsten oxide source. A source of ionized nitrogen is then provided adjacent the substrate and lithium is deposited in the presence of the ionized nitrogen to both form a thin lithium-nitride ion transfer film on the exposed surface and to diffuse lithium into the precursor film to thereby form the electrochromic layer. An electrolyte film comprising lithium is then deposited onto the ion transfer film, an ion storage film is deposited onto the electrolyte film and a second, transparent, electrode film is deposited onto the ion storage film. The vacuum processing chamber is then vented and contacts are selectively applied to portions of the second electrode film Finally, an overcoat layer, which is preferably a transparent polymer, is applied over the second electrode so as to provide environmental protection for the ECD.

In a preferred process making the ECD requires that the vacuum processing chamber be pumped down only twice. The first evacuation is used to deposit a first electrode that will subsequently contact the EC layer. During the second evacuation all the other thin film portions of the ECD—i.e., the EC, ion transfer, EL, IS and IS-electrode layers—are formed. It is thus one of the objects of the invention to provide an ECD fabrication process that is faster than those used in the prior art and that require fewer vacuum processing cycles.

Another aspect of the invention is that it provides a method of introducing an ion transfer layer between an electrochromic layer and an electrolyte layer in an electrochromic device of the sort in which a mobile ionic species, such as lithium, passes through the electrolyte layer when moving between the electrochromic layer and an ion storage layer. This method involves depositing an electrochromic precursor layer on a substrate disposed in a vacuum processing chamber and then providing both a source of the mobile ion and inflow of a selected gas adjacent the substrate. This gas is selected to react with the mobile species to form the ion transfer layer while the mobile species diffuses into the EC precursor film to form the actual EC layer. In a preferred embodiment, where the mobile ion is lithium, the gas may be ionized nitrogen. In this preferred process the gas is introduced at a pressure in excess of the background pressures of oxygen and hydroxyl ions in the processing chamber so as to form a lithium nitride ion transfer film. Subsequent to loading the precursor film and forming the ion transfer film, the EL layer is formed, preferably by depositing LiF in the presence of the flowing nitrogen to form a lithium fluoro-nitride electrolyte layer. After that, the inflow of the selected gas is halted and the IS and top electrode layers are deposited.

Although the foregoing discussion is directed to the use of a lithium fluoro-nitride electrolyte layer in an electrochromic device, it should be recognized that thin lithium fluoro-nitride electrolyte layers have utility in a variety of electrical devices such as batteries.

Preferred processes of the invention lead to a reduction in overall process time when compared to prior art processes for making electrochromic devices. This advantage may be gained by a design that avoids the use of thick, slowly deposited flexibility and adhesion promoting layers and that does not require venting of the vacuum processing chamber prior to deposition of the IS electrode.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 4b is a graph depicting changes in optical transmission as a function of time for the sample of FIG. 4a.

DETAILED DESCRIPTION OF A PREFERRED EMBODIMENT OF THE INVENTION

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description, one may note that the terms "include" and "comprise," as well as derivatives thereof, mean inclusion without limitation; the term "or," is inclusive, meaning and/or. As is conventional in the ECD arts, the process step of forming an active layer by diffusing a mobile ionic species into a deposited precursor layer is referred to as 'loading'.

Figure 1:
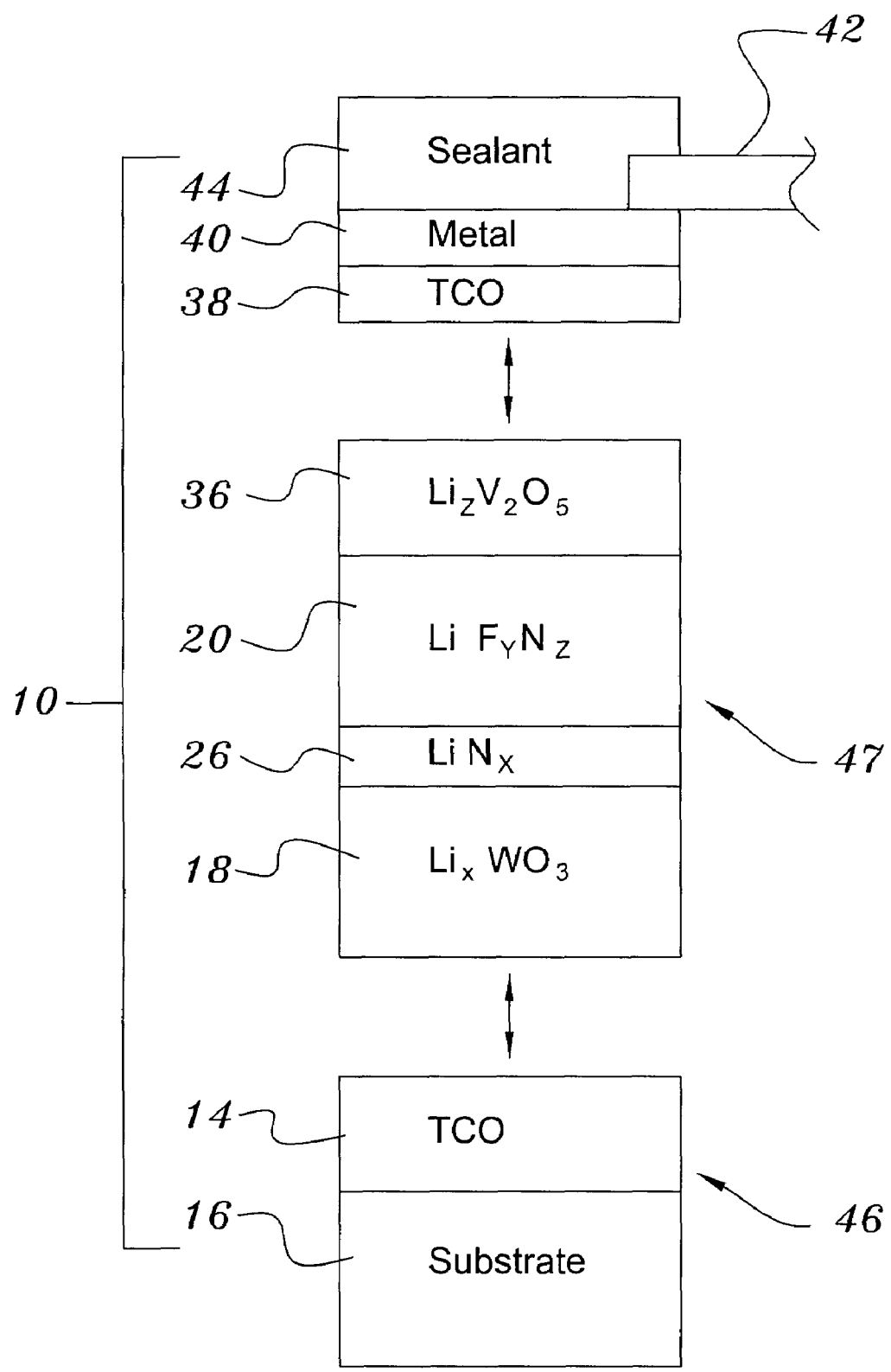
FIG. 1 is an exploded schematic sectional view of an electrochromic device of the invention where the thickness of the various layers is intentionally not to scale in the interest of clarity of presentation.

Turning now to FIG. 1, one finds a schematic depiction of a preferred ECD device of the invention 10.

One part of preparing the device 10 comprises depositing an electrode, which is normally a transparent conducting oxide (TCO) electrode 14, and which preferably comprises Indium Tin Oxide (ITO), on a suitable transparent substrate 16, which may be glass or plastic, among other choices, and then providing a pattern of metallic bus bars (not shown) on the ITO surface before depositing what will become an EC layer 18. In a preferred embodiment of the present invention the EC electrode 14 is deposited directly on a substrate 16 regardless of the substrate's flexibility. In one embodiment, the ITO EC electrode 14 may have a thickness of substantially 200 to 500 nm.

Although ITO is the preferred EC electrode, it should be recognized that many other electronic conductors can be used, subject to the condition that if the ECD 10 is to be used in transmission, rather than reflection, the EC electrode 14 must also be transparent. Materials other than ITO that satisfy these constraints include, but are not limited to TCOs such as ZAO (Al-doped ZnO); mixtures of $SnO_2$ and ZnO; fluorine doped tin or zinc oxides; as well as a multi-layer arrangement described in Applicant's U.S. patent application Ser. No. 11/278,643, filed on Apr. 4, 2006, the disclosure of which is herein incorporated by reference.

In the foregoing, it will be recognized by those skilled in the arts that various approaches are possible for providing the metallic bus bar contacts to the EC electrode, and that these do not necessarily differ between the preferred embodiment of the present invention and the prior art.

In the preferred embodiment of the present invention an EC precursor layer is vacuum deposited on the EC electrode and then loaded with the mobile ion of choice to form the EC layer 18. This EC precursor may comprise a metal oxide film. In the examples discussed hereinafter, this is a tungsten oxide film that is between 20 and 1000 nm thick, is preferably 200 to 600 nm thick, and that more preferably is between 300 and 400 nm thick.

Although the preferred EC precursor layer comprises tungsten oxide, other materials known in the ECD art may also be used. Such materials include, but are not limited to, oxides of molybdenum, titanium, tantalum, and niobium; tungsten oxide doped with silver or gold; and organic electrochromic materials. Moreover, ternary metal oxides, such as $Mo_xW_yO_z$, can also be used to form EC layers.

Although the preferred mobile ion is lithium, it should be recognized that other species known in the ECD art may be used. These comprise, but are not limited to, hydrogen, potassium, and silver. Use of a mobile species other than lithium may lead to the use of an EC-forming process step that differs from that used in the preferred process disclosed hereinafter.

In the preferred process of the invention, the EC layer 18 is formed from the EC precursor by depositing lithium in the presence of ionized nitrogen. This both loads the EC precursor film to form a lithiated tungsten oxide and simultaneously forms a lithium-nitride ion transfer layer 26. The lithiated tungsten oxide can be represented as $Li_xWO_3$, where the parameter x is generally in the range of 0.1 to 0.35 and preferably in the range of 0.15 to 0.25.

In the foregoing, nitrogen is preferably introduced into a vacuum processing chamber 30 from a piping structure or ring 32 adjacent the substrate 16 and having a plurality of orifices 34 disposed along its length. At least a portion of the gas flowing out of the ring is ionized to enhance a reaction with lithium to form a lithium-nitride ion transfer layer 26 while the lithium is diffusing into the tungsten oxide, a process commonly referred to as 'loading'. Judging from measured deposition rates, a preferred ion transfer layer 26 is about 2-3 nm thick. The reader will understand that the ring or piping arrangement may have any of a number of shapes; moreover, a variety of apparatus, including, but not limited to End-Hall and Kaufman Gridded ion sources can used to ionize the nitrogen. Generally speaking, the amount of nitrogen introduced into the vacuum processing chamber is enough so that the partial pressure of nitrogen exceeds the residual partial pressures of oxygen and hydroxide. In a particular preferred process, the introduction of nitrogen raised the pressure in the deposition chamber to about $5 \times 10^{-5}$ Torr from a background level of approximately $1 \times 10^{-6}$ Torr.

After forming the thin lithium nitride ion transfer layer 26, a lithium-fluoro-nitride electrolyte layer (EL) 20 is formed by evaporating LiF in the presence of the ionized nitrogen to form a lithium-fluoro-nitride EL. In a preferred embodiment this EL layer is substantially 150 to 500 nm thick and is preferably 250 to 400 nm thick. The preferred EL layer may be represented as $LiF_yN_z$ where the y parameter is generally in the range of 0.05 to 0.20. It will be recognized that there are many other choices for the electrolyte layer, and that those skilled in the ECD arts will recognize that these include, but are not limited to LiF, $LiAlF_4$, $Li_3N$, $SiO_x$, $CaF_2$, $LiTaO_3$, $LiPO_2$, $Li_3PO_4$, as well as an oxide mixture commonly referred to as LIPON.

In the preferred process an ion storage (IS) layer 36, which may be vanadium oxide, is then deposited directly on the EL until an IS film of 80-400 nm, and preferably 150-270 nm, thickness is formed. Although the preferred device uses $Li_zV_2O_5$, where the parameter z is less than 0.41 in the bleached condition, those skilled in the art will recognize that many other materials may be considered for use as an IS layer and that these comprise, but are not limited to, binary oxides such as CoO, $IrO_2$, MnO, NiO, $PrO_x$, and ternary oxides such as $Ce_xV_yO_z$.

The IS layer 36, in turn, is then preferably coated with a 10-100 nm (preferably 30-70 nm) TCO (preferably ITO) layer 38 and a thin transparent metal layer 40. The metal layer is preferably silver that may have a thickness of at least 5 and at most several hundred nanometers. In particularly preferred embodiments the silver film is in the range of 8-20 nm. This procedure generates a transparent IS electrode that provides adequate protection against ambient oxygen and water vapor so that the electroded ECD structure can be removed from the vacuum processing chamber, have metal contacts 42 attached to it, and be overcoated with a suitable protective polymer 44, or could be adhesively bonded to a transparent superstrate (not shown). Moreover, as will be subsequently described in greater detail in one of the examples presented in a subsequent portion of this disclosure, a selected combination of a thinner ITO layer than reported in the prior art with a thin, transparent, silver layer provides a transparent electrode having higher electronic conductivity than does the IS electrode used in some prior art devices.

In the preferred embodiment using an ITO and a silver layer as a composite IS electrode, the ITO layer is believed to function as both an electron transport layer and as a buffer layer that prohibits diffusion of silver into the $V_2O_5$ IS layer. It may be noted that in an embodiment using a metal other than silver, or an IS layer other than $V_2O_5$, diffusion of the metal into the oxide might not be a problem, which could obviate the need for the ITO buffer layer.

In the preferred process, the substrate 16 is initially provided with the patterned EC electrode 14 to form an electroded substrate subassembly 46. This is loaded into a vacuum chamber 30 where the active ECD layers 47 are deposited. That is, after the patterned EC electrode is prepared, all subsequent vacuum deposition steps in the preferred process occur during a single pumping cycle.

Figure 2:
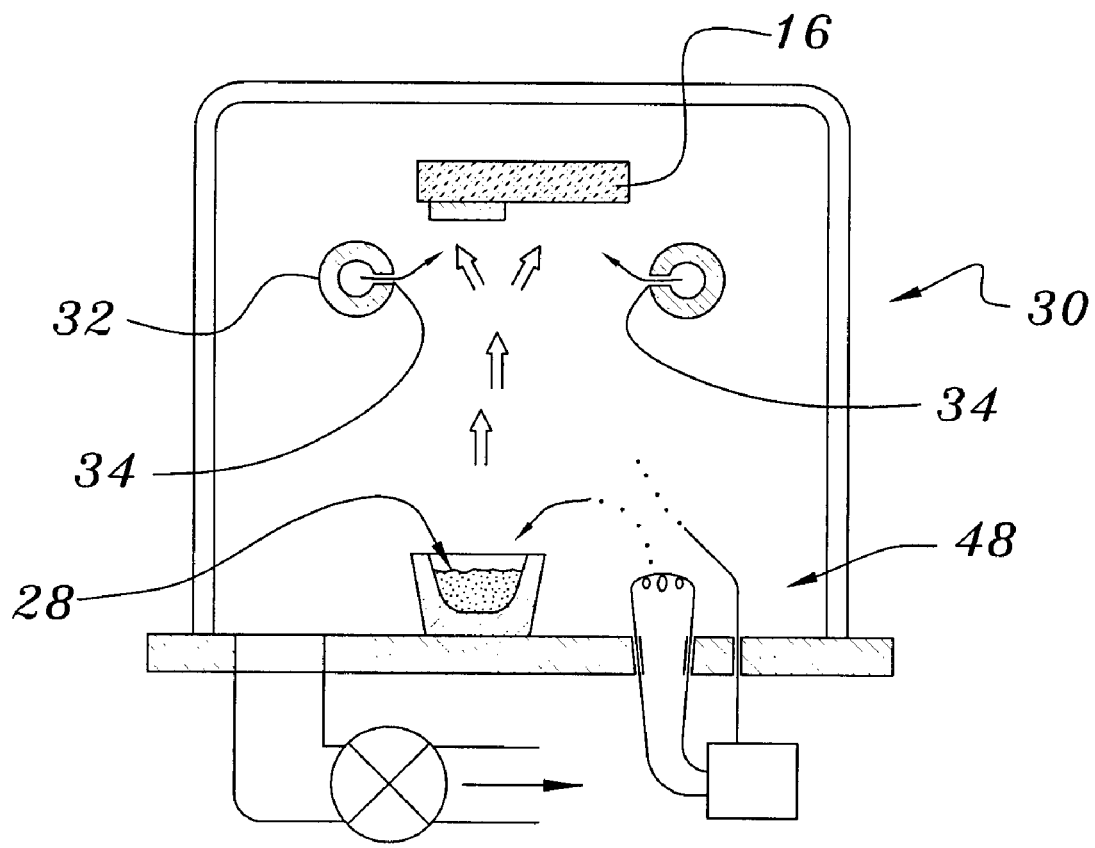
FIG. 2 is a schematic view of a vacuum processing chamber used in fabrication of an electrochromic device of the invention.

The films described herein are preferable deposited by electron beam evaporation, as schematically depicted in FIG. 2. The reader will understand, however, that many other physical vapor deposition methods, including vapor deposition from a resistively heated crucible, sputtering, etc., could also be employed in practicing the invention. Moreover, as is known in the art of ECD fabrication, the evaporation rates and substrate surface temperatures are controlled so that the deposition and diffusion rates of the mobile ion (e.g., lithium) are comparable.

Example 1

Figure 3:
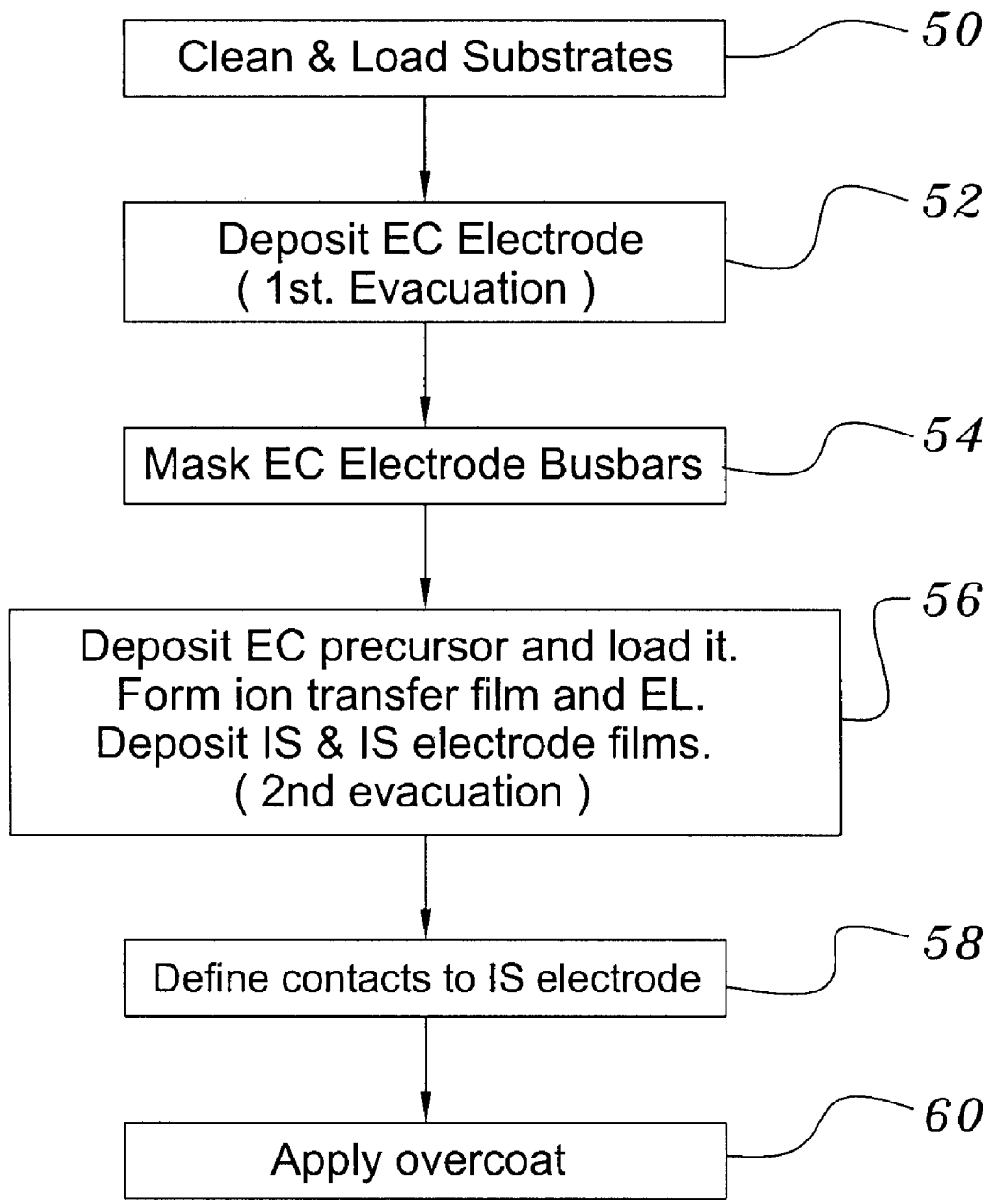
FIG. 3 is process flow chart depicting steps in a preferred process of making an electrochromic device.

A Preferred Structure was Made by the Process Depicted in Overview in FIG. 3.

Both glass and polyethylene terephthalate substrates 16 were cleaned with detergent and deionized water, spun dry under clean room conditions, and loaded (Step 50) into a vacuum processing chamber 30. The chamber 30 was then pumped down to a background pressure of approximately $10^{-5}$ Torr. Indium-tin-oxide was deposited from a source 28 heated by an electron beam 48 at a rate of approximately 0.2 nm/sec to yield a total thickness of 200 nm (Step 52). The vacuum system was then opened and bus bar metallization patterns were applied to the ITO layer (Step 54).

The samples were re-loaded into the vacuum chamber, which was evacuated to $10^{-7}$ Torr in a second evacuation (Step 56). About 300 nm of tungsten trioxide was deposited by e-beam evaporation at a rate of about 1 nm/sec. A 'nitrogen shower' was then turned on to provide ionized nitrogen at a pressure of about $5 \times 10^{-5}$ Torr near the substrate. Lithium, from a lithium metal source, was then e-beam deposited at a rate of 0.15 nm/sec until a total nominal thickness of 137 nm was achieved. As noted in the earlier discussion, during this 'loading' step of the process most of the lithium diffused into the tungsten trioxide precursor layer to form the lithiated tungsten oxide EC layer, while some of the lithium was consumed in forming a thin lithium nitride ion transfer layer on the exposed surface of the EC layer.

With the nitrogen shower still running, the lithium source was replaced with a LiF one and LiF was deposited at a rate of 0.5 nm/sec until an Li—F—N electrolyte layer with a thickness of 300 nm had been deposited onto the Li—N ion transfer layer.

The nitrogen shower was then turned off and vanadium pentoxide was evaporated at a rate of 0.5 nm/sec to form an ion storage layer 36 that was 230 nm thick.

The IS layer was coated with a composite IS electrode film consisting of 50 nm of ITO that was e-beam evaporated from an ITO source and deposited at a rate of 0.2 nm/sec and 12 nm of silver that was e-beam evaporated from a silver source and deposited at a rate of 0.4 nm/sec.

The ECD samples were then removed from the vacuum processing chamber and electrical leads 42 were attached (Step 58). Following that, a polymer overcoat 44, consisting of a proprietary optical adhesive referred to as Norland 73 was applied by dipping and was subsequently UV cured (Step 60). This product is supplied by the Norland Products Company of Cranbury, N.J., US. Those skilled in the ECD arts will appreciate that many other sorts of transparent polymeric coatings can be used with ECDs to provide environmental protection.

Figure 4A:
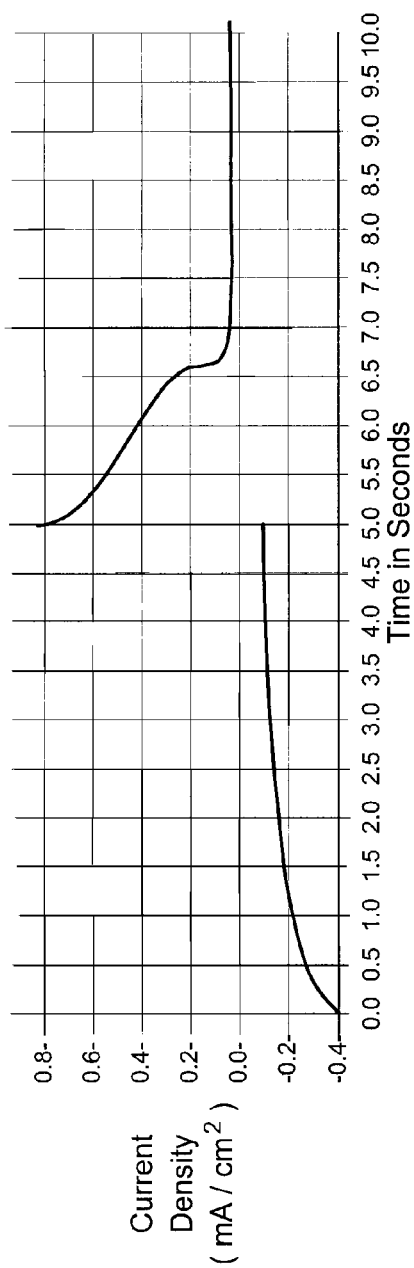
FIG. 4a is a graph depicting coloring and bleaching currents as a function of time for a preferred ECD of the invention.
Figure 4B:
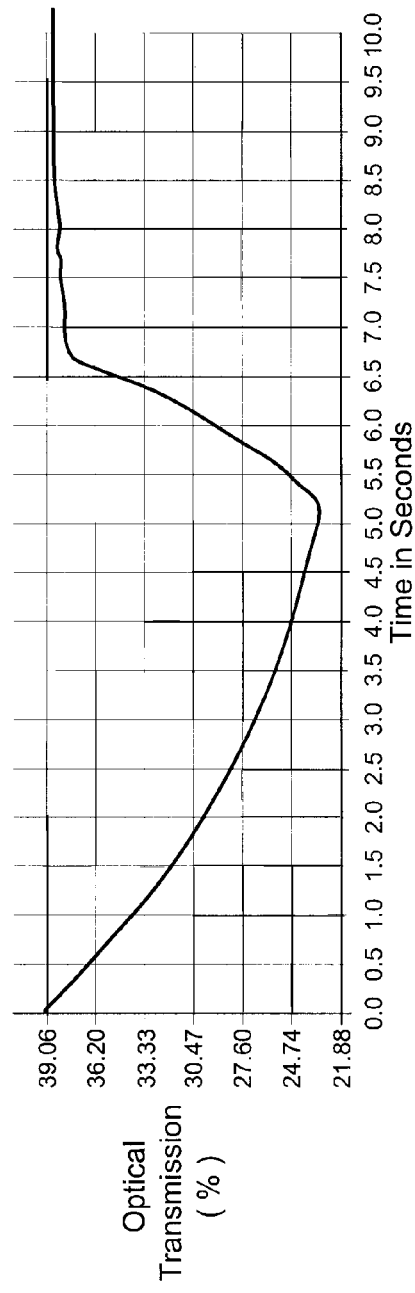

The optical and electrical performance of ECDs made in accordance with this preferred method are depicted in FIGS. 4a, 4b. The ECDs are initially colored (i.e., during an initial 0-5 sec interval) by application of an appropriate DC voltage. The polarity of the voltage was then reversed and the ECDs were bleached in the subsequent two to five second interval. To color the ECDs, 1.6 V was applied, where the lithiated vanadium oxide had the positive polarity. To bleach the ECDs, 0.6 V was applied with the EC layer having the positive polarity. Integration of the current-time plot showed that the charge in the ECD was 14 mCoulomb/cm$^2$ which indicates that the molecular charge fraction of Li in the EC and IS films correspond to chemical formulae of $Li_{0.22}WO_3$ (nominally $Li_xWO_3$) when colored, and $Li_{0.4}V_2O_5$ (nominally $Li_{0.22}VO_5$) when bleached, respectively. The reader should note that the parameters x (<0.23) and z (<0.41) in the foregoing represent compositional variations occurring as charge is injected or withdrawn.

No performance degradation of ECDs made according to the preferred process was noted after any of the following: approximately 1 million cycles of operation; immersion in water; exposure to 55° C. at 95% relative humidity in the presence of UV radiation for a week; thermal cycling between −50 and +50 degrees Celsius or after thermal shock cycling between −23 and +25 degrees Celsius. In addition, those samples prepared on polyethylene terephthalate (PET), polyethylene napthalate (PEN) or polyimide substrates could survive having the substrate bent to a ten inch radius of curvature with the ECD being on either the internal or external surface of the bent material.

Example 2

Effect of Using Ionized Nitrogen During Lithium Loading

In two experimental runs, ECDs were made in accordance with the process spelled out in Example 1, except that ionized nitrogen was not used during lithium evaporation and loading. In one of these runs nitrogen was introduced at the same background pressure as noted above, but the ionizing field was not applied. In the other run, no nitrogen was introduced into the processing chamber. In both cases, the ECDs operated, but the switching speeds were four to five times slower than for the preferred devices.

Example 3

Effect of Using Ionized Nitrogen During Electrolyte Layer Formation

In two experimental runs, ECDs were made in accordance with the process spelled out in Example 1, except that ionized nitrogen was not used during lithium fluoride evaporation. In one of these runs nitrogen was introduced at the same background pressure as noted above, but the ionizing field was not applied. In the other run, no nitrogen was introduced into the processing chamber. In both cases, the ECDs operated, but the switching speeds were one hundred to one hundred fifty times slower than for the preferred devices.

Example 4

Effect of IS Electrode Resistance

The measured sheet resistance of the top, IS, electrode in the ECDs made according to the preferred process of Example 1 is three to four ohms per square. An ECD was made according to the preferred process, except for the omission of the Ag layer from the IS electrode. This resulted in a thick ITO-only electrode having a sheet resistance of 70 ohms per square. The associated ECD had the same optical performance as did an ECD made entirely with the preferred process of Example 1, but had a switching speed that was three to five times slower.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. A method of making an electrochromic device in which a selected ionic species is selectively movable through an electrolyte layer interposed between an electrochromic layer and an ion storage layer, the method comprising the sequentially executed steps of:
   providing, in a vacuum processing chamber, a substrate having a first electrode layer disposed thereon;
   depositing onto the first electrode layer an electrochromic precursor film comprising a metal oxide selected for its capacity to have the selected mobile species diffused thereinto;
   providing a source of the mobile species while providing inflow of a selected gas adjacent the substrate, the gas selected to react with the mobile species while the mobile species diffuses into the metal oxide film to thereby form the electrochromic layer from the electrochromic precursor film and to form an ion transfer layer on an exposed surface of the electrochromic layer;
   forming, on the ion transfer film, an electrolyte layer;
   depositing an ion storage film onto the electrolyte film; and
   depositing a second, transparent, electrode onto the ion storage film; and
   opening the vacuum processing chamber.

2. The method of claim 1 wherein the substrate and the first electrode layer are both transparent, and wherein at least one metal contact is electrically connected to the first electrode layer prior to providing, in the vacuum chamber, the substrate having the first electrode layer thereon.

3. The method of claim 1 wherein the selected mobile species comprises lithium.

4. The method of claim 1 wherein the selected gas comprises ionized nitrogen.

5. The method of claim 1 wherein the selected gas comprises nitrogen and the ion transfer film comprises lithium nitride.

6. The method of claim 1 wherein the electrolyte film is a lithium fluoro-nitride.

7. The method of claim 1 wherein the ion storage film comprises an oxide of at least one of vanadium, cobalt, iridium, manganese, nickel, praseodymium and cerium.

8. The method of claim 7 wherein the metal oxide selected for its capacity to have the selected mobile species diffused thereinto is an oxide of one of tungsten, molybdenum, titanium, tantalum and niobium.

9. The method of claim 1 wherein the second electrode comprises a transparent conductive oxide layer having a metal layer deposited thereon.

10. The method of claim 1 wherein all of the depositing steps are carried out by one of electron beam evaporation and vapor deposition from a heated crucible.

11. A method of making an electrochromic device having an ion transfer layer disposed between an electrochromic layer and an electrolyte layer so that a mobile ionic species passes through the ion transfer and electrolyte layers when moving between the electrochromic layer and an ion storage layer during operation of the device, the method comprising the steps of:

depositing, on a substrate disposed in an evacuated vacuum processing chamber, an electrochromic precursor film comprising an oxide selected for its capacity to have the selected mobile species diffused thereinto;

providing a source of the mobile species while also providing inflow of a selected gas adjacent the substrate, the gas selected to react with the mobile species while the mobile species diffuses into the oxide film and to thereby form both the electrochromic layer and an ion transfer layer on an exposed surface thereof, the gas introduced at a pressure in excess of a background pressure of one of oxygen and hydroxide in the processing chamber;

depositing the electrolyte layer; and depositing the ion storage layer.

12. The method of claim 11 wherein the mobile species is lithium and the selected gas is nitrogen.

13. The method of claim 11 wherein at least a portion of the selected gas is ionized during the inflow thereof.

14. The method of claim 11 wherein the electrochromic precursor layer comprises an oxide of one of tungsten, molybdenum, titanium, tantalum and niobium.

15. The method of claim 11 wherein the electrolyte layer consists of lithium, fluorine and nitrogen.

16. A method of making a lithium-fluoro-nitride electrolyte layer portion of an electrochromic device, the method comprising the steps of:

providing, in a vacuum deposition chamber, a substrate having at least one vacuum-deposited thin film layer disposed thereon, the at least one thin film comprising a metal oxide film selected for its capacity to have lithium ions diffused thereinto;

evaporating lithium fluoride to provide a source of lithium fluoride vapor in the vacuum deposition chamber; and providing a source of ionized nitrogen interposed between the source of lithium fluoride vapor and the substrate so as to deposit the lithium-fluoro-nitride electrolyte layer directly on the metal oxide film.

17. The method of claim 16 wherein the ionized nitrogen is provided at a pressure in excess of a background pressure of one of oxygen and hydroxide in the processing chamber.

* * * * *